(12) United States Patent
Kim

(10) Patent No.: US 9,244,336 B2
(45) Date of Patent: Jan. 26, 2016

(54) BATTERY COVER ASSEMBLY WITH SLIDING DOOR, AND PORTABLE ELECTRONIC DEVICE INCLUDING THE BATTERY COVER ASSEMBLY

(75) Inventor: Shi-hyun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1094 days.

(21) Appl. No.: 13/304,878

(22) Filed: Nov. 28, 2011

(65) Prior Publication Data

US 2012/0315527 A1  Dec. 13, 2012

(30) Foreign Application Priority Data

Jun. 7, 2011  (KR) .................. 10-2011-0054640

(51) Int. Cl.
| | |
|---|---|
| *H01M 2/00* | (2006.01) |
| *H05K 5/00* | (2006.01) |
| *H05K 7/00* | (2006.01) |
| *G06F 1/16* | (2006.01) |
| *H04B 1/00* | (2006.01) |
| *G03B 17/02* | (2006.01) |
| *H01M 2/10* | (2006.01) |

(52) U.S. Cl.
CPC ............ *G03B 17/02* (2013.01); *H01M 2/1066* (2013.01); *G03B 2217/007* (2013.01)

(58) Field of Classification Search
CPC ... H01M 2/10; H01M 2/1016; H01M 2/1022; H01M 2/02; H01M 2/0202; H01M 2/04; H01R 13/447; H04N 5/2251; H05K 5/0239–5/03

USPC ............ 429/98, 100, 163, 175, 182; 396/277, 396/539, 536; 455/575.1–575.9; 361/679.01–727; 348/374, 372

See application file for complete search history.

(56) References Cited

U.S. PATENT DOCUMENTS

| | | | | |
|---|---|---|---|---|
| 5,199,888 | A * | 4/1993 | Condra ................. | G06F 1/1616 312/292 |
| 5,689,400 | A * | 11/1997 | Ohgami ................ | G06F 1/1616 361/679.27 |
| 5,960,156 | A * | 9/1999 | Nishiyama ........... | H04N 5/2252 348/374 |
| 6,203,363 | B1 * | 3/2001 | Yanaura ........................ | 439/500 |
| 6,426,871 | B2 * | 7/2002 | Foster ................... | G06F 1/1616 361/679.1 |
| 7,023,692 | B2 * | 4/2006 | Mansutti et al. ......... | 361/679.56 |
| 2006/0188249 | A1 * | 8/2006 | Noguchi ................ | G03B 17/02 396/536 |
| 2010/0143780 | A1 * | 6/2010 | Yang et al. .................... | 429/100 |

* cited by examiner

*Primary Examiner* — Barbara Gilliam
*Assistant Examiner* — Claire L Roe
(74) *Attorney, Agent, or Firm* — Drinker Biddle & Reath LLP

(57) ABSTRACT

Battery cover assemblies functioning to open/close a terminal connection, and portable electronic devices including the battery cover assemblies are disclosed. A battery cover assembly is provided that includes a first plate having a first opening, a second plate having a second opening corresponding to the first opening, the second plate being combined with the first plate on one side of the first plate, and a sliding door disposed between the first and second plates for sliding between a closed position where the first and second openings are closed and an open position where the first and second openings are open.

11 Claims, 5 Drawing Sheets

BATTERY COVER ASSEMBLY WITH SLIDING DOOR, AND PORTABLE ELECTRONIC DEVICE INCLUDING THE BATTERY COVER ASSEMBLY

CROSS-REFERENCE TO RELATED PATENT APPLICATION

This application claims the priority benefit of Korean Patent Application No. 10-2011-0054640, filed on Jun. 7, 2011, in the Korean Intellectual Property Office, the disclosure of which is incorporated herein in its entirety by reference.

BACKGROUND

1. Field of the Invention

One or more aspects of the invention relate to battery cover assemblies and portable electronic devices including the battery cover assemblies, and more particularly, to battery cover assemblies functioning to open/close a terminal connection, and portable electronic devices including the battery cover assemblies.

2. Description of the Related Art

A variety of portable electronic devices including, for example, digital cameras, digital camcorders, or portable phones, are equipped with connection terminals for connecting the portable electronic devices to other information devices, such as personal computers (PCs), or peripheral devices. Examples of the connection terminals may include universal serial bus (USB) ports for PCs, power connectors for rechargeable devices, and audio jacks, for example.

The connection terminal of a portable electronic device needs to be exposed to the outside when the portable electronic device is to be connected to an external device. On the other hand, after being disconnected from the external device, the connection terminal is preferably closed with a cover so as to prevent extraneous materials from coming into contact with the connection terminal.

As portable electronic devices have become smaller in terms of volume and thinner in terms of thickness, spaces for installing connection terminal covers in the portable electronic devices are becoming insufficient. In the case of installing a cover to open/close the connection terminal in the portable electronic device, an extra attachment, such as a hinge, is needed to enable the cover to be rotatably combined with a case of the portable electronic device. However, this may increase the number of parts of the device. Furthermore, because a sufficient space for the cover to be installed at a specific position of the case of the portable electronic device needs to be secured, freedom of disposing the terminal connection is restricted.

SUMMARY

The invention provides battery cover assemblies functioning to open/close a connection terminal and portable electronic devices including the battery cover assemblies.

The invention also provides battery cover assemblies functioning to open/close a connection terminal and designed for use in a compact structure, and portable electronic devices including the battery cover assembly.

According to an aspect of the invention, there is provided a battery cover assembly including a first plate having a first opening, a second plate having a second opening corresponding to the first opening, the second plate being combined with the first plate on one side of the first plate, and a sliding door disposed between the first and second plates for sliding between a closed position where the first and second openings are closed and an open position where the first and second openings are open.

The first opening may be open to the outside at an edge of a side of the first plate.

The sliding door may include a projection that protrudes from a surface exposed to the outside through the first opening.

The first plate may include a bulkhead that extends along edges of the first plate and protrudes toward the second plate, the second plate may combine with the bulkhead to form an inner space, and the sliding door may be disposed in the internal space.

The first plate may further include a guiding unit that protrudes toward the second plate in the internal space and meets with the sliding door.

The sliding door may further include an elastically deformable combiner that protrudes toward the guiding unit, the guiding unit further including one or more projections that protrude toward and selectively engage the elastically deformable combiner.

In the battery cover assembly, at least two projections may be disposed apart from each other, and the elastically deformable combiner may include a combining projection that protrudes to engage the projections.

The sliding door may include a guiding groove that combines with the guiding unit and extends along a movement path of the sliding door.

The sliding door may further include projections that protrude from the guiding groove toward the guiding unit to restrict the movement of the sliding door by contacting the guiding unit.

According to another aspect of the invention, there is provided a portable electronic device including a main body having a battery receptacle, a terminal connection disposed in the battery receptacle, and a battery cover assembly rotatably combined with the main body at an edge on one side of the battery receptacle. The battery cover assembly including a first plate having a first opening, a second plate having a second opening corresponding to the first opening, the second plate being combined with the first plate on one side of the first plate, and a sliding door disposed between the first and second plates for sliding between a closed position where the first and second openings are closed and an open position where the first and second openings are open.

The first plate may include a bulkhead that extends along edges of the first plate and protrudes toward the second plate, the second plate may combine with the bulkhead to form an inner space, and the sliding door may be disposed in the internal space.

The first plate may further include a guiding unit that protrudes toward the second plate to meet the sliding door in the internal space.

The sliding door may further include an elastically deformable combiner that protrudes toward the guiding unit, the guiding unit further including one or more projections that protrude toward and engage the elastically deformable combiner.

The sliding door may include a guiding groove that combines with the guiding unit and extends along a movement path of the sliding door.

The sliding door may further include projections that protrude from the guiding groove toward the guiding unit to restrict the movement of the sliding door by contacting the guiding unit.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, exemplary embodiments of the invention will be described with reference to the accompanying drawings.

Figure 1:
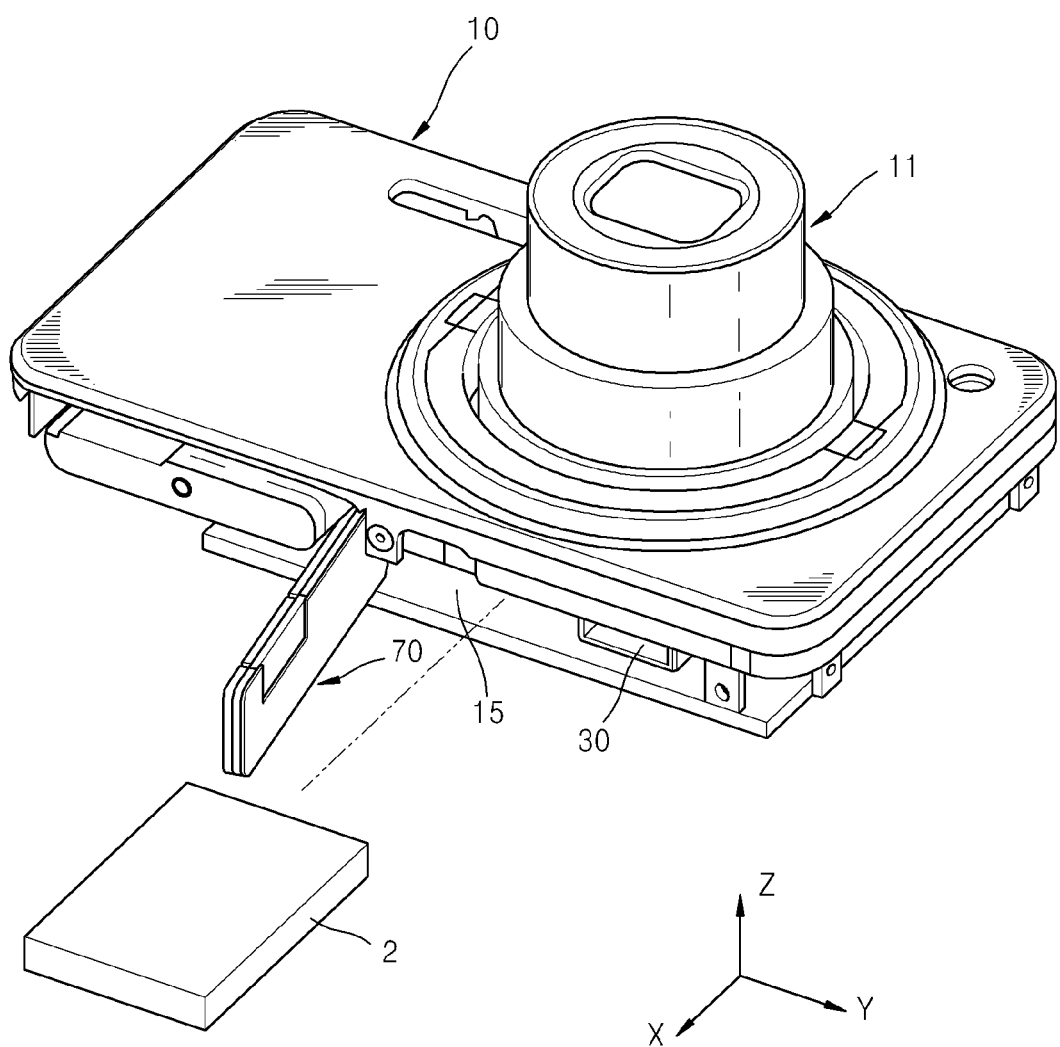
FIG. 1 is a perspective view of a portable electronic device including a battery cover assembly, according to an embodiment of the invention.

FIG. 1 is a perspective view of a portable electronic device including a battery cover assembly, according to an embodiment of the invention.

The portable electronic device having the battery cover assembly includes a main body 10 equipped with a battery receptacle 15, a terminal connection 30 disposed in or proximate to the battery receptacle 15, and a battery cover assembly 70 to be combined with the battery receptacle 15.

In the illustrated example, although the portable electronic device is a digital camera, it is not limited thereto and may also be a different device, such as, a digital camcorder, a portable phone, a multimedia player, etc.

The main body 10 of the portable electronic device may be manufactured from metals, such as, aluminum or stainless steel, or plastics.

A lens barrel 11 disposed on the front of the main body 10 includes a lens, functioning to receive an image of an object and adjust a focus.

The battery receptacle 15 is formed at an edge of a side of the main body 10 for battery insertion. The terminal connection 30 is disposed in or proximate to the battery receptacle 15. The terminal connection 30 may be, for example, a universal serial bus (USB) port, a memory port for installing a memory card, a multimedia port for outputting/receiving audio or video signals, etc. As shown in FIG. 1, the battery cover assembly 70 is disposed on a side of the battery receptacle 15 of the main body 10 and is rotatably combined with the main body 10.

Figure 2:
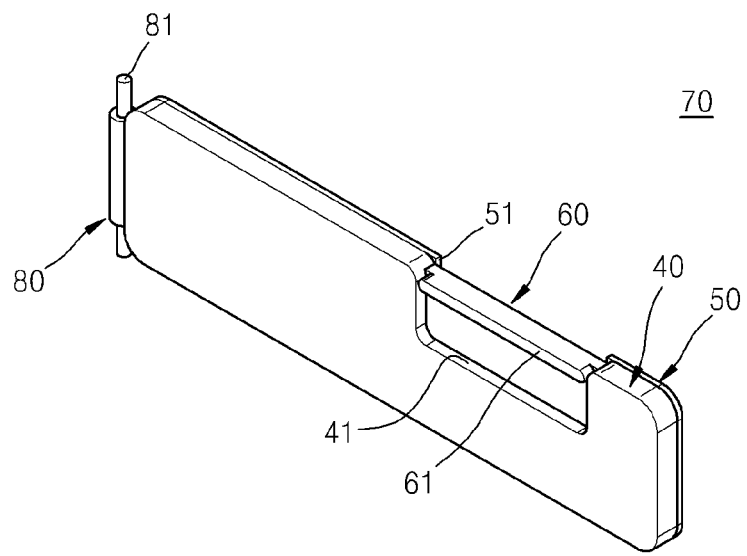
FIG. 2 is a perspective view of a front part of the battery cover assembly of FIG. 1.
Figure 3:
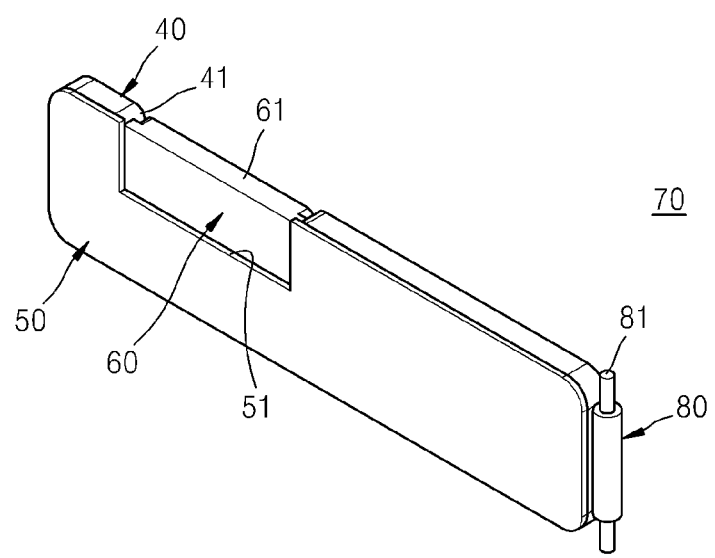
FIG. 3 is a perspective view of a rear part of the battery cover assembly of FIG. 1.
Figure 4:
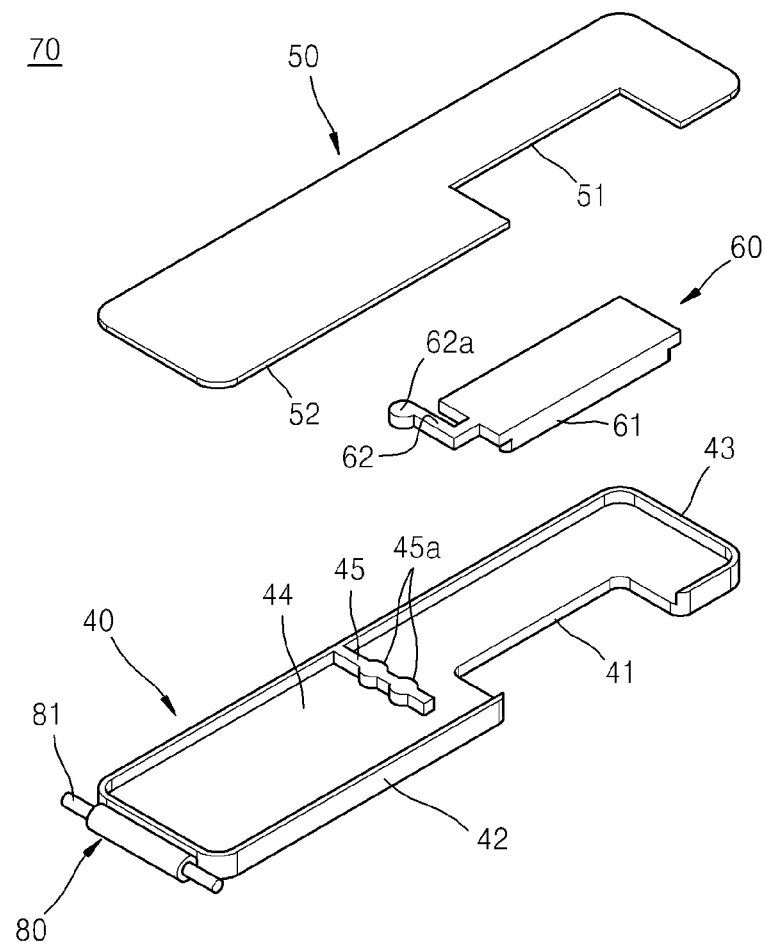
FIG. 4 is an exploded perspective view of parts of the battery cover assembly of FIG. 1 for representing a combining mechanism between the parts.

FIG. 2 is a perspective view of the battery cover assembly 70 of FIG. 1, FIG. 3 is a perspective view of a rear part of the battery cover assembly 70 of FIG. 2, and FIG. 4 is an exploded perspective view of parts of the battery cover assembly 70 of FIGS. 2 and 3 for representing a combining mechanism between the parts.

The battery cover assembly 70 is rotatably combined with the main body 10 by a rotating connection 80 (see FIGS. 2 and 3) interposed between the battery cover assembly 70 and the main body 10 through a rotating axis 81. The rotating connection 80 pivots around the rotating axis 81. When the battery cover assembly 70 rotates with respect to the rotating axis 81 and leaves the battery receptacle 15 open, as shown in FIG. 1, a battery 2 may be inserted into or taken out of the battery receptacle 15.

The battery 2 serves to supply electric power to the portable electronic device. When the battery 2 is inserted in the battery receptacle 15, the battery cover assembly 70 may support the battery 2 so that it does not fall out of the main body 10. As shown in FIG. 1, the battery 2 need not fill the entire battery receptacle 15. However, the battery 2 may fill the entire battery receptacle 15 such that the terminal connection 30 is disposed proximate to the battery receptacle 15.

Referring to FIGS. 2 to 4, the battery cover assembly 70 includes a first plate 40, a second plate 50 combined with the first plate 40 on one side of the first plate 40, and a sliding door 60 disposed between the first and second plates 40 and 50.

The first and second plates 40 and 50 are manufactured to have a size or dimension to cover the battery receptacle 15 of FIG. 1. The first plate 40 includes a first opening 41 located in a position corresponding to the terminal connection 30. The second plate 50 also has a second opening 51 corresponding to the first opening 41.

The first opening 41 is formed to open toward the outside from an edge of a side 42 of the first plate 40. The second opening 51 is formed to open toward the outside from an edge of a side 52 of the second plate 50. However, the embodiment is not limited to the shape of the illustrated first and second openings 41 and 51, and the shape of the first and second openings 41 and 51 may be modified to have various forms.

The sliding door 60 is disposed between the first and second plates 40 and 50 and is able to slide in order to open or close the first and second openings 41 and 51. The sliding door 60 has a projection 61 that protrudes from the face of the first opening 41 toward the outside. The projection 61 functions as a handle for allowing a user of the portable electronic device to manually manipulate the sliding door 60.

The first plate 40 includes a bulkhead 43 that extends along edges of the first plate 40 and projects toward the second plate 50. The second plate 50 is combined with the bulkhead 43, so an internal space 44 is formed by the bulkhead 43 between the first and second plates 40 and 50. The sliding door 60 is disposed in the internal space 44.

The first plate 40 has a guiding unit 45 formed in the internal space 44, protruding toward the second plate 50 to meet a side of the sliding door 60.

The sliding door 60 has a deformable elastic combiner 62 on one side thereof protruding toward the guiding unit 45 of the first plate 40. At an end of the elastic combiner 62 is formed a combining projection 62a protruding toward the guiding part 45 of the first plate 40.

The guiding unit 45 includes one or more projections 45a protruding toward the elastic combiner 62 to apply a force to the elastic combiner 62. At least two projections 45a are disposed to be separated apart from each other, and thus the combining projection 62a of the elastic combiner 62 may be held so as not to move when engaging the projections 45a, thereby ensuring the sliding door 60 maintains its position.

Figure 5:
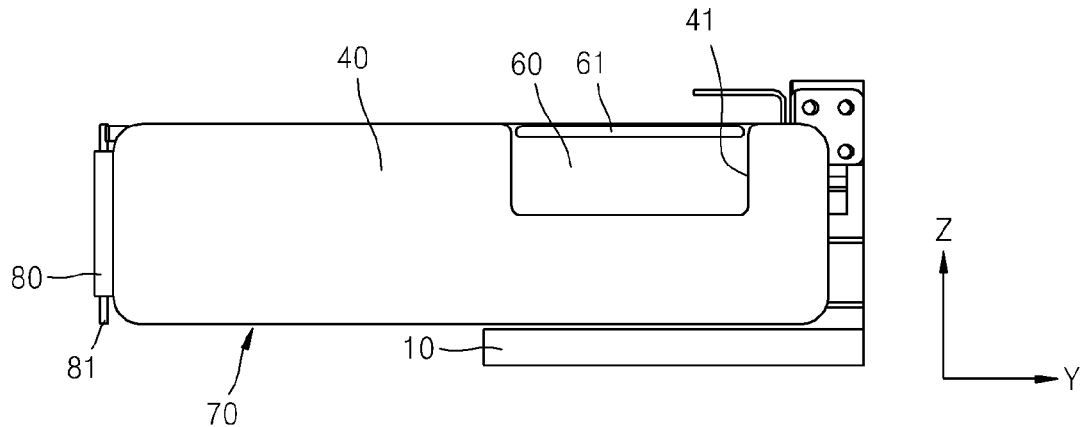
FIG. 5 is a bottom view of the portable electronic device of FIG. 1.
Figure 6:
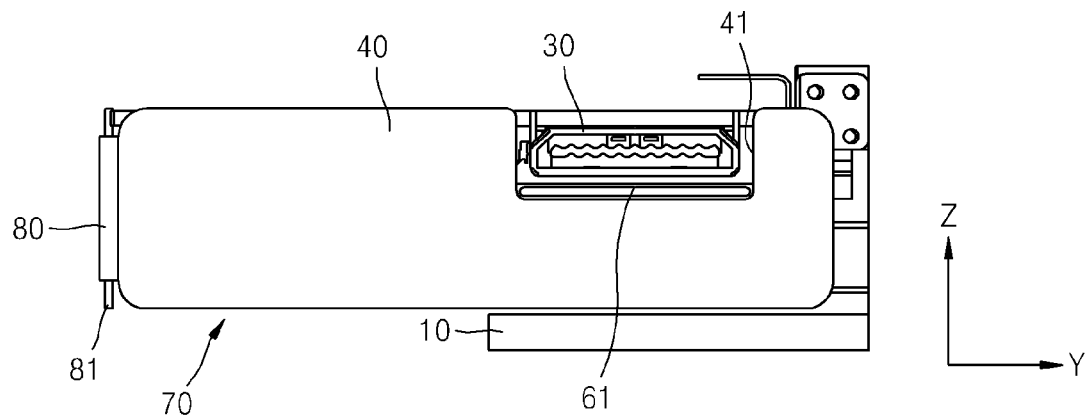
FIG. 6 is a view of the portable electronic device of FIG. 5 for explaining functions of the battery cover assembly.
Figure 7:
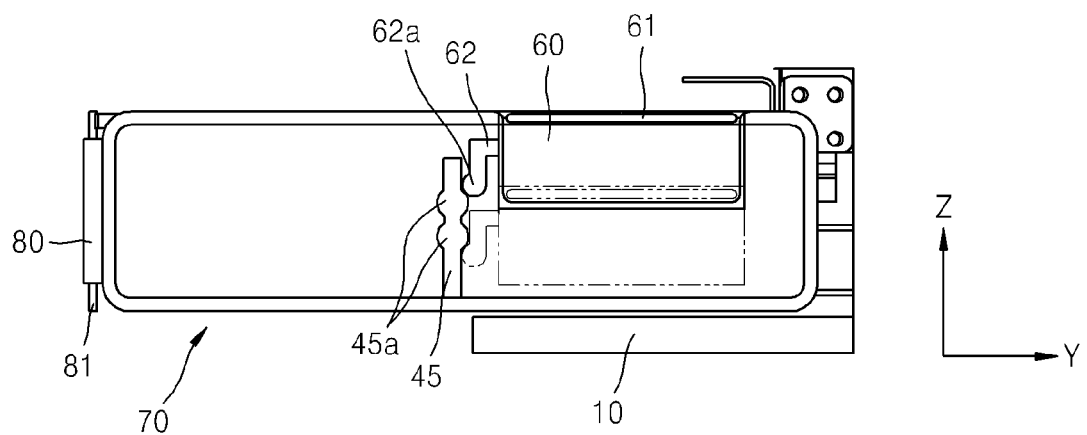
FIG. 7 is another view of the portable electronic device of FIG. 5 for explaining functions of the battery cover assembly.

FIG. 5 is a bottom view of the portable electronic device of FIG. 1, FIG. 6 is a view of the portable electronic device of FIG. 5 for explaining functions of the battery cover assembly 70, and FIG. 7 is another view of the portable electronic device of FIG. 5 for explaining functions of the battery cover assembly 70.

FIG. 5 shows the sliding door 60 in a closed position where the first and second openings 41 and 51 are closed, while FIG. 6 shows the sliding door 60 in an open position where the first and second openings 41 and 51 are open. As such, the sliding door 60 may slide back and forth between closed and open positions.

Referring to FIGS. 5 to 7, the sliding door 60 moves upward or downward in a Z-axis direction. When the sliding door 60 moves upward in the Z-axis direction, it goes to the closed position. In the closed position, because the combining projection 62a of the sliding door 60 is supported by an upper projection 45a, the sliding door 60 may be maintained in the closed position.

If the user presses the sliding door 60 while in the closed position downward in the Z-axis direction, the combiner 62 is pressed in the right direction as the combining projection 62a passes the upper projection 45a.

When the sliding door 60 moves downward in the Z-axis direction, the combining projection 62a passes a lower projection 45a and then the sliding door 60 ends up in the open position, as shown in FIG. 6. In the open position, because the combining projection 62a is supported by the lower projection 45a, the sliding door 60 may be maintained in the open position.

The battery cover assembly 70 described above may be selective operated to allow the battery 2 to be inserted into the main body 10, open the battery receptacle 15 to take the battery 2 out of the main body 10, or close the battery receptacle 15. The battery cover assembly 70 may also support the battery 2 inserted into the main body 10 so that it is maintained therein and does not fall out.

In addition, in the case of connecting the portable electronic device to an external device, the battery cover assembly 70 may be selectively operated to expose the terminal connection 30 by manipulating the sliding door 60 into the open position (see FIG. 6).

In a conventional portable electronic device, a terminal connection has to be disposed at a distance from a battery receptacle because an extra brace is needed to enable opening or closing of the terminal connection. This causes some problems in that wiring connecting the terminal connection to internal circuits of the portable electronic device becomes complicated and freedom of design in disposing the circuits or the terminal connection is restricted.

Because the battery cover assembly 70, according to the embodiment described above, has the sliding door 60 to selectively expose or cover the terminal connection 30, the terminal connection 30 may be disposed in the battery receptacle 15. This results in improved freedom in disposing the terminal connection 30 and circuitry of the portable electronic device, and wiring simplification while designing the portable electronic device.

In addition, without the need for an extra cover brace for the terminal connection 30, the terminal connection 30 may be disposed on the bottom of the portable electronic device. This may allow a showcased product to be displayed without spoiling its appearance and make it more secure against theft because an external power cable connected to the product may be hidden underneath the product.

Referring to FIG. 1, there may be a connection (not shown) disposed inside the main body 10 that is electrically coupled with terminals of the battery 2 and is powered from the battery 2. Alternatively, the battery cover assembly 70 may perform as a terminal to receive power from the battery 2 and to distribute the power to other components in the main body 10.

To do this, a terminal part (not shown) electrically coupled with the terminals of the battery 2 may be disposed in the second plate 50 of the battery cover assembly 70. The terminal part may be implemented by, for example, attaching a thin flat conductive piece of metal to the second plate 50, laying an electrical wire under the second plate 50, or coating a conductive wire on the surface of the second plate 50.

Figure 8:
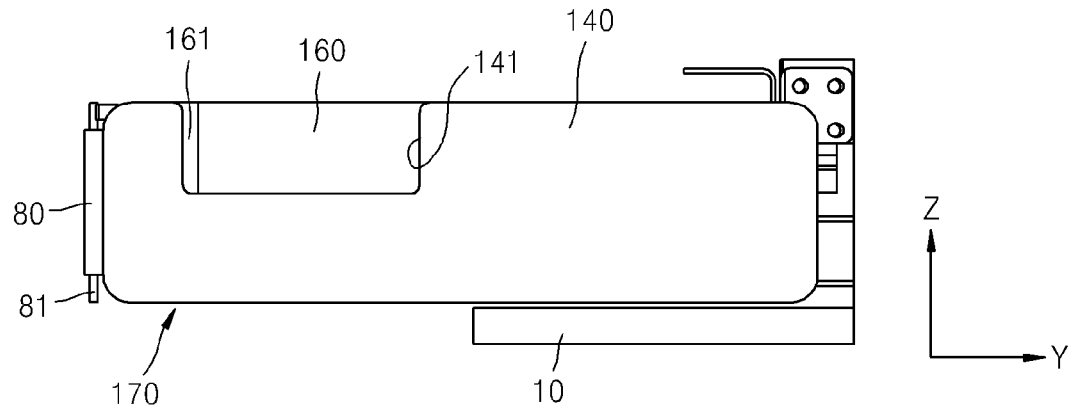
FIG. 8 is a bottom view of a portable electronic device including a battery cover assembly, according to another embodiment of the invention.
Figure 9:
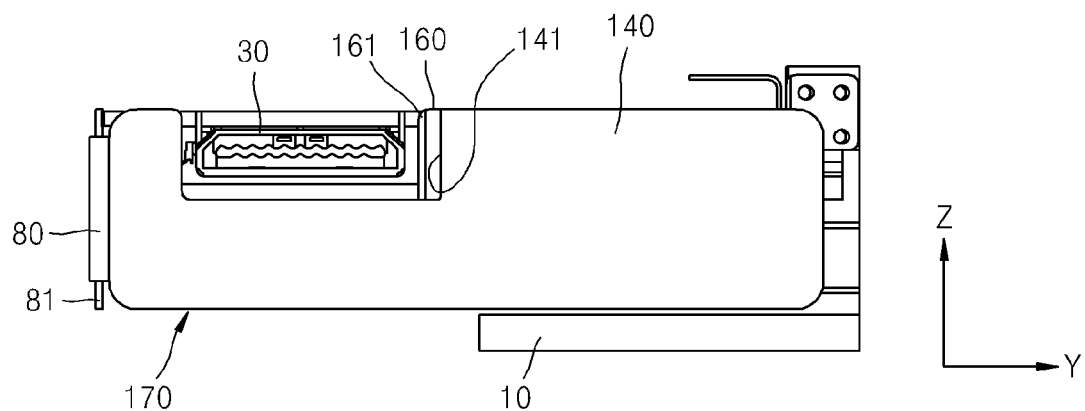
FIG. 9 is a view for explaining functions of the battery cover assembly of the portable electronic device of FIG. 8.
Figure 10:
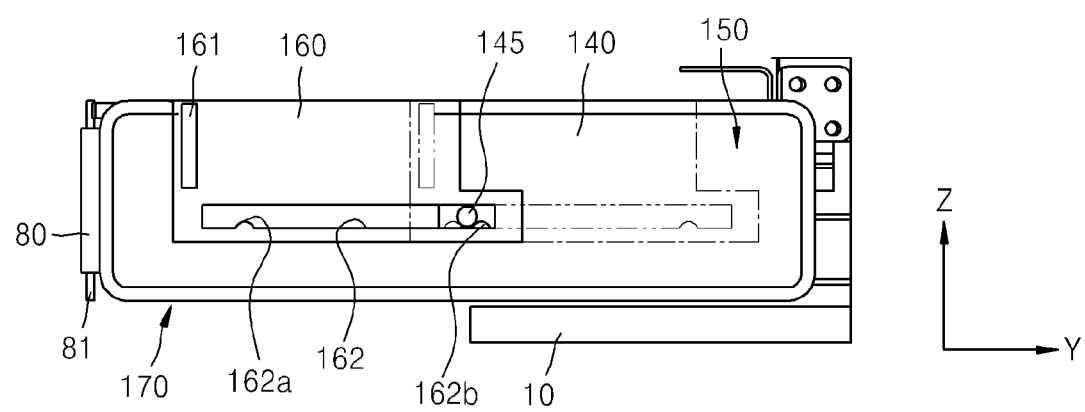
FIG. 10 is another view for explaining functions of the battery cover assembly of the portable electronic device of FIG. 8.

FIG. 8 is a bottom view of a portable electronic device including a battery cover assembly 170, according to another embodiment of the invention, FIG. 9 is a view of the portable electronic device for explaining functions of the battery cover assembly 170 of FIG. 8, and FIG. 10 is another view of the portable electronic device for explaining functions of the battery cover assembly 170 of FIG. 8.

The battery cover assembly 170 according to an embodiment shown in FIGS. 8 and 9 is rotatably combined with a main body 10 by interposing a rotating connection 80 having a rotating axis 81 between the battery cover assembly 170 and the main body 10. The battery cover assembly 170 includes a first plate 140, a second plate 150 combined with the first plate 140 on one side of the first plate 140, and a sliding door 160 disposed between the first and second plates 140 and 150.

Overall configurations of the first and second plates 140 and 150 are similar to those of the battery cover assembly 70 according to the embodiment shown in FIGS. 1 to 7, and thus an illustration of the second plate is omitted in FIGS. 8 and 9, and FIG. 10 illustrates the second plate 150 in place of a part of the first plate 140.

The first plate 140 includes a first opening 141 open to the outside. The sliding door 160 is disposed to be able to slide so that it may open or close the first opening 141. The sliding door 160 may move in a Y-axis direction. As shown in FIG. 8, when the sliding door 160 slides in the Y-axis direction to the left and thus leaves the first opening 141 closed, the sliding door 160 is said to be in a closed position.

Meanwhile, as shown in FIG. 9, when the sliding door 160 slides in the Y-axis direction to the right and thus leaves the first opening 141 open, the sliding door 160 is said to be in an open position.

The sliding door 160 has a projection 161 that protrudes from the face of the first opening 141 toward the outside. The projection 161 functions as a handle for allowing a user of the portable electronic device to manually manipulate the sliding door 160.

Referring to FIG. 10, the first plate 140 has a guiding unit 145 that protrudes toward the second plate 150 and supports the sliding door 160 so that it is able to slide. Although the guiding unit 145 is implemented to be in the form of a single pin having a circular cross-section as in the illustrated example, the guiding unit 145 may be implemented to have various shapes and may be one or more, as long as it supports the sliding door 160 so that it is able to slide.

The sliding door 160 has a guiding groove 162 that extends along the movement path of the sliding door 160 in the Y-axis direction. The guiding groove 162 is combined with the guiding unit 145 to enable the sliding door 160 to be supported by the guiding unit 145 and move smoothly.

The configuration for enabling the sliding door 160 to slide in the Y-axis direction is not limited to the illustrated embodiment, but may be implemented to have various modified forms. For example, the guiding groove 162 may be installed in the first plate 140 while the guiding unit 145 may be installed in the sliding door 160.

Referring to FIG. 10, the sliding door 160 includes projections 162a and 162b that protrude toward the guiding unit 145 to restrict the movement of the sliding door 160 by the guiding unit 145. When the sliding door 160 is in the closed position, the left side of the guiding unit 145 meets the right projection 162b, holding the sliding door 160 so as to maintain it in the closed position. When the sliding door 160 is in the open position, the right side of the guiding unit 145 meets the left projection 162a, holding the sliding door 160 so as to maintain it in the open position.

The battery cover assembly 170 described above functions to open and close the battery receptacle and to prevent a battery inserted into the battery receptacle from falling out.

Furthermore, the battery cover assembly 170 equipped with the sliding door 160 may expose the terminal connection 30 by simply manipulating the sliding door 160 to move it into the open position, when the portable electronic device needs to be connected to an external device.

According to the embodiments described above, the battery cover assembly and the portable electronic device including the battery cover assembly may use or cover the terminal connection therein by opening or closing the sliding door installed in the battery cover assembly, which simplifies arrangement of the terminal connection in the portable electronic device as well as wiring between the terminal connection and the circuitry of the portable electronic device.

The apparatus described herein may include a processor, a memory for storing program data to be executed by the processor, permanent storage such as a disc drive, a communication port to communicate with external devices, a user interface including a touch panel, keys, buttons, etc. The method may be implemented in software modules or algorithms and may be stored as computer-readable codes or program instructions executable on the processor. Examples of the computer readable storage medium include all kinds of storage devices that can be read by a computer system, including for example, a read only memory (ROM), a random access memory (RAM), a compact disk-ROM (CD-ROM), a magnetic tape, a floppy disk, an optical data storage deice, and so on. The computer readable storage medium can also be distributed among computer systems that are interconnected through a network, and the invention may be stored and implemented as computer readable program codes.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe theses embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by a number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented using algorithms that may be executed in one or more processors. Furthermore, the invention could imply any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar references in the context of describing the invention (especially in the context of the following claims) are to be construed to cover both the singular and the plural. Furthermore, recitation of ranges of values herein are merely intended to serve as a shorthand method of referring individually to each separate value falling within a range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The invention is not limited to the order in which the steps are described. The use of any and all examples, or exemplary language (e.g., "such as" or "for example") provided herein, is intended merely to better illuminate the invention and does not pose a limitation to the scope of the invention unless otherwise claimed. Numerous modifications and adaptations will be readily apparent to those of ordinary skill in this art without departing from the spirit and scope of the invention.

What is claimed is:

1. A battery cover assembly rotatably combined with a main body of a portable electronic device at an edge on one side of a battery receptacle of the main body having a terminal connection disposed in the battery receptacle, the battery cover assembly comprising:
   a first plate having a first opening;
   a second plate having a second opening corresponding to the first opening, the second plate being combined with the first plate on one side of the first plate to form an inner space between the first plate and the second plate;
   a rotating connection disposed on at least one of the first plate and the second plate and rotatably connecting the first plate and the second plate to the main body; and
   a sliding door disposed in the inner space between the first and second plates for sliding between a closed position where the first and second openings are closed and an open position where the first and second openings are open;

wherein the first plate and second plate open or close the battery receptacle by rotating together with respect to the main body, the first and second openings correspond to the terminal connection when the first plate and second plate close the battery receptacle, and the sliding door slides to the open position to expose the terminal connection when the first plate and second plate are rotated to close the battery receptacle, wherein the first plate further comprises a guiding unit protruding toward the second plate in the inner space and meeting the sliding door in the inner space, and wherein the sliding door further comprises an elastically deformable combiner protruding toward the guiding unit, the guiding unit further comprising one or more projections protruding toward and selectively engaging the elastically deformable combiner.

2. The battery cover assembly of claim 1, wherein the first opening is open to the outside at an edge of a side of the first plate.

3. The battery cover assembly of claim 2, wherein the sliding door comprises a projection protruding from a surface exposed to the outside through the first opening.

4. The battery cover assembly of claim 1, wherein the first plate comprises a bulkhead extending along edges of the first plate and protruding toward the second plate, the second plate being combined with the bulkhead to form the inner space.

5. The battery cover assembly of claim 1, wherein at least two projections of the guiding unit are separated apart from each other, and the elastically deformable combiner includes a combining projection protruding to engage the projections.

6. The battery cover assembly of claim 1, wherein the sliding door comprises a guiding groove combining with the guiding unit and extending along a movement path of the sliding door.

7. The battery cover assembly of claim 6, wherein the sliding door further comprises projections protruding from the guiding groove toward the guiding unit to restrict the movement of the sliding door by contacting the guiding unit.

8. A portable electronic device comprising,
a main body having a battery receptacle;
a terminal connection disposed in the battery receptacle; and
a battery cover assembly rotatably combined with the main body at an edge on one side of the battery receptacle, the battery cover assembly including:
a first plate having a first opening;
a second plate having a second opening corresponding to the first opening, the second plate being combined with the first plate on one side of the first plate to form an inner space between the first plate and the second plate;
a rotating connection disposed on at least one of the first plate and the second plate and rotatably connecting the first plate and the second plate to the main body; and
a sliding door disposed in the inner space between the first and second plates for sliding between a closed position where the first and second openings are closed and an open position where the first and second openings are open;

wherein the first plate and second plate open or close the battery receptacle by rotating together with respect to the main body, the first and second openings correspond to the terminal connection when the first plate and second plate close the batter receptacle, and the sliding door slides to the open position to expose the terminal connection when the first plate and second plate are rotated to close the battery receptacle, wherein the first plate further comprises a guiding unit protruding toward the second plate in the inner space and meeting the sliding door, and wherein the sliding door further comprises an elastically deformable combiner protruding toward the guiding unit, the guiding unit further comprising one or more projections protruding toward and selectively engaging the elastically deformable combiner.

9. The portable electronic device of claim 8, wherein the first plate comprises a bulkhead extending along edges of the first plate and protruding toward the second plate, the second plate being combined with the bulkhead to form the inner space.

10. The portable electronic device of claim 8, wherein the sliding door comprises a guiding groove combining with the guiding unit and extending along a movement path of the sliding door.

11. The portable electronic device of claim 10, wherein the sliding door further comprises projections protruding from the guiding groove toward the guiding unit to restrict the movement of the sliding door by contacting the guiding unit.

* * * * *